3,383,428
PRODUCTION OF CYCLICS AND AROMATICS
Jennings H. Jones and Merrell R. Fenske, State College, Pa., assignors to Esso Research and Engineering Company, a corporation of Delaware
No Drawing. Filed Feb. 23, 1966, Ser. No. 529,236
14 Claims. (Cl. 260—666)

ABSTRACT OF THE DISCLOSURE

Unsaturated cyclics and aromatics are prepared from carbonyls, olefins, alcohols, and mixtures thereof by condensation in liquid phosphoric acid, which may be followed by hydrogenation to naphthenes or dehydrogenation to aromatics, the utility of the process being in the upgrading of available materials to more important and less readily available materials.

---

This invention relates to the conversion of aliphatic or naphthenic type carbonylic, olefinic, or alcoholic compounds, or mixtures thereof in high yields to higher molecular weight cyclic hydrocarbon compounds having at least twice the number of carbon atoms as the original compounds. More particularly, this invention relates to a process for the conversion of carbonylic, olefinic, or alcoholic compounds or mixtures thereof to a mixture of higher molecular weight hydrocarbon compounds comprising unsaturated cycloaliphatic hydrocarbons and aromatic hydrocarbons, having at least twice the number of carbon atoms as the original compounds. The products of this conversion are not only a valuable source of chemicals and chemical intermediates, but the process also serves to increase the molecular weight of carbonylic, alcoholic, or olefinic feeds by two to four or more times. Such a process is useful where it is desired to convert certain readily abundant hydrocarbon or oxygenated compounds to more desirable and less readily abundant cyclic hydrocarbons. For example, it may be desirable to convert low molecular weight compounds, e.g. $C_4$-$C_{10}$, in the gasoline range to higher molecular weight compounds in the diesel, jet fuel, or fuel oil ranges. In a preferred embodiment of this invention, the cyclic reaction products are catalytically dehydrogenated to produce high yields of aromatic hydrocarbons. In another embodiment of this invention, the cyclic reaction products are hydrogenated to produce saturated cyclic hydrocarbons useful as turbine fuels, internal combustion engine fuels, heating oils, and lubricants. In yet another embodiment of this invention, the cyclic reaction products may be converted to epoxides, acids, and other oxygenated substances useful as solvents, resins, plastics, or other valuable chemical intermediates.

In carrying out the present invention, a mixture comprising unsaturated cycloaliphatic hydrocarbons and aromatic hydrocarbons is prepared by the liquid or vapor phase condensation of carbonylic, olefinic, or alcoholic feed stocks, or mixtures thereof, in a phosphoric acid catalyst medium. The products resulting from the condensation are dimers and trimers of the feed stock coupled with the dehydrogenation of a portion of the condensed materials. In the case of alcoholic and carbonylic compounds simultaneous dehydration also occurs during the condensation reaction; thus, yielding a product containing only hydrocarbons. The products of the reaction, i.e. unsaturated cycloaliphatic hydrocarbons and substituted aromatic hydrocarbons (wherein the term substituted includes aliphatic or cyclic appendages to the parent ring structure), are characterized by having at least two to four or more times the number of carbon atoms as the reacting carbonylic, olefinic, or alcoholic compounds. The unsaturated cycloaliphatic compounds may be mono- or poly-nuclear compounds having one or more double bonds per molecule.

In a preferred embodiment of this invention the product of the condensation reaction product may be catalytically dehydrogenated over a suitable dehydrogenation catalyst to produce high yields of substituted aromatic hydrocarbons having at least twice the number of carbon atoms as the original feed. In a like manner, the condensation reaction product may be hydrogenated to produce saturated cyclic hydrocarbons, i.e. naphthenes.

In general, the feed to the condensation reaction may comprise carbonylic, olefinic, or alcoholic compounds or mixtures thereof with other oxygenated organic compounds, e.g. epoxides, and may preferably be prepared by the vapor phase oxidation of aliphatic type hydrocarbon fractions. Examples of suitable hydrocarbon fractions are naphthas, gasolines, heating oils, gas oils, and generally hydrocarbons boiling below about 550° C. at atmospheric pressures, preferably 50–300° C., more preferably 50–200° C. Olefins may also be prepared by thermal cracking and other pyrolytic treatment of hydrocarbons; by catalytic dehydrogenation of hydrocarbons; by dehydrochlorination of suitable chloro compounds; or, by dehydration of alcohols. Carbonylic compounds may be prepared by dehydrogenation or oxidation of hydroxylated compounds; oxidation of olefins; and isomerization of epoxides.

More specifically, the compounds applicable to the process of this invention are those carbonylic, olefinic, or alcoholic compounds, or mixtures thereof having about 3 to 30 carbon atoms. Carbonylic compounds represented by the formula:

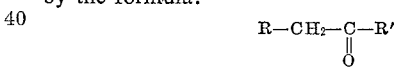

wherein R is a hydrogen atom, alkyl or cycloalkyl radical, and, R' is a hydrogen atom, alkyl, cycloalkyl, hydroxyl, or alkoxy radical. Preferred compounds are those having from 3 to 16 carbon atoms and may be illustrated by the following: acetone, propionaldehyde, methylethyl ketone, methylpropyl ketone, methylbutyl ketone, butyraldehyde, valeraldehyde, diethyl ketone, ethyl propyl ketone, ethyl butyl ketone, hexamethyl ketone, heptaldehyde, isopropyl butyl ketone, diisopropyl ketone, diisobutyl ketone, and the like. Particularly preferred carbonylic compounds are the ketones wherein R is a hydrogen atom or alkyl radical and R' is an alkyl radical in the above formula.

Alcohols having 3 to 30 carbon atoms, preferably 3 to 16 carbon atoms, may also be utilized in the process of the invention. The alcohols may be saturated or unsaturated, aliphatic or cycloaliphatic, mono- or polyhydric, and of a primary, secondary, or tertiary nature. Non-limiting examples of alcohols are: n-propyl and isopropyl alcohols, butanols, hexanols, octanols, allyl alcohol, crotyl alcohol, cyclopentanol, cyclohexanol, propanediols, butanediols, glycerol, and the like.

Olefinic compounds, aliphatic or cyclic, having about 3 to 30 carbon atoms, preferably 5 to 16 carbon atoms, may also be employed. Generally, compounds possessing at least one nonaromatic carbon to carbon double bond may be employed, e.g. monoolefins, diolefins, and mixtures thereof. Examples of such olefins are: butylene, butadiene, pentenes, pentadiene, hexenes, heptenes, octenes, cyclopentene, cyclopentadiene, cyclohexene, and the like. Unsaturated oxygenated compounds may also be employed.

It is to be understood that this invention contemplates the use of carbonylic, alcoholic, or olefinic compounds either separately or in mixtures or as complex mixtures comprising alcohols, olefins, epoxides, ketones, aldehydes, etc.

The liquid catalyst medium in which the condensation reaction takes place may be phosphoric acid, superphosphoric acid, polyphosphoric acid, or a mixture of phosphoric and sulfuric acids where solubility of olefins or ketones will be increased. The weight ratio of phosphoric acid in the catalyst to the feed should be about 0.1–10 based on $P_2O_5$ content of the phosphoric acid, and preferably 0.5–2. The $P_2O_5$ content of the phosphoric acid should normally be about 60–90%, preferably 70–80% based on the weight of $P_2O_5$. The use of other acids as catalysts is not recommended since sulfuric acid by itself leads to charring of the products while hydrochloric acid volatilizes during the reaction.

The temperature of the reaction will vary with the type of feed employed, but normally will range from about 125° C. to about 350° C., preferably 150–250° C. Pressure is not critical and may vary from atmospheric to about 500 p.s.i.g.

In one embodiment of this invention, high yields of aromatics are obtained by catalytic dehydrogenation of all or suitable portions of the product. The dehydrogenation reaction is effected at temperatures ranging from about 280° C. to about 450° C., preferably 350° C. to 400° C., over a suitable dehydrogenation catalyst. Catalysts that may be used in this process step include platinum, nickel, cobalt-molybdenum, rhodium, palladium, and ruthenium. Frequently, these catalysts are conveniently used on supports such as alumina. The condensation product is passed over the dehydrogenation catalyst at flow rates ranging from about 0.1 to 10 parts by weight of feed to catalyst per hour. Provision for venting should be included in the equipment because of the evolution of hydrogen gas.

The product of the condensation reaction resulting from the phosphoric acid treatment is comprised of aromatics and unsaturated cycloaliphatics having one or two olefinic linkages. Accordingly, the catalytic dehydrogenation step converts the remaining unsaturated cycloaliphatics to aromatic hydrocarbons in high yields.

In another embodiment of this invention, the condensation products resulting from the phosphoric acid treatment may be hydrogenated to convert both the unsaturated cycloaliphatic hydrocarbons and the aromatic hydrocarbons to saturated mono- or polycyclic hydrocarbons, i.e. naphthenes. Hydrogenation is normally carried out at temperatures ranging from about 100–250° C. and pressures of about 200–800 p.s.i.g. However, temperature and pressure conditions may vary above or below these ranges depending upon catalysts, feed make-up, etc. Preferred conditions for hydrogenation are temperatures of 150–200° C. and pressures of 400–700 p.s.i.g. in the presence of catalysts such as nickel, platinum, ruthenium, rhodium, etc.; preferably supported on carbon, kieselguhr, alumina, etc., e.g. nickel on kieselguhr, platinum on carbon or alumina. If desired, the products of the catalytic dehydrogenation or hydrogenation reactions may be recycled to increase the yields of the desired hydrocarbons.

The following examples will serve to fully illustrate the present invention. However, these examples are not to be construed as limiting this invention in any way. In order to illustrate this invention, a single pure product was utilized in most examples. However, complex mixtures are treated similarly, as shown in Example 1.

In all of the condensation reactions in liquid phosphoric acid, the reaction vessel was a one-liter, three-necked, Morton flask containing a Teflon-covered stirrer. A thermometer, extending into the liquid, was mounted in one of the openings. The other openings had mounted in them a 250 cc. dropping bottle (which contained the feed for the condensation reaction) and a water collector with a condenser attached to it. The heat was supplied by means of an electric heating mantle controlled by a variable voltage transformer. The equipment was mounted on a magnetic stirrer which was used to agitate the liquid medium magnetically through the Teflon-coated stirrer. Gas chromatographic analysis of the products of all examples showed complex structures.

Example 1.—Reaction of oxidized naphtha product in phosphoric acid

A virgin naphtha boiling from 60 to 150° C. was oxidized in the vapor phase at atmospheric pressure at 400° C. About 60% of the naphtha was converted to oxygenated and olefinic products. The liquid product from this oxidation which contained about 50% of unchanged feed and 40% of oxygenated compounds, e.g. aldehydes, ketones, epoxides, and 10% of olefinic, e.g. pentenes, hexenes, etc., boiled from 20 to 170° C. at atmospheric pressure.

A portion of the above oxidation product was treated with an equal weight of polyphosphoric acid at 150° C. for a period of 3 hours. The organic layer from this treatment with polyphosphoric acid was washed with water and distilled to recover the unchanged naphtha. This distillation was readily accomplished since the hydrocarbon reaction product from the phosphoric acid treatment ranged from two to four times the carbon atom content of the original naphtha. This high-boiling product consisted of a mixture of $C_{12}$ and higher aromatics and olefinic cyclic hydrocarbons.

The high boiling hydrocarbon product on hydrogenation over a nickel on kieselguhr catalyst at 299° C. and 400 p.s.i.g. gave a water-white hydrocarbon mixture rich in naphthenes.

Futher, another portion of the high-boiling hydrocarbon produced as above on dehydrogenation over a platinum on alumina catalyst at 395° C. and 50 p.s.i.g. gave a product rich in $C_{12}$ and higher aromatics.

Example 2—Reaction of acetone in phosphoric Acid

A quantity totaling 100 parts of acetone was added to 400 parts by weight of 90% phosphoric acid. At the beginning of the addition the reaction temperature dropped to 124° C. at which time the addition of acetone was stopped and all the unreacted acetone and water were allowed to distill from the reaction vessel while the reaction temperature climbed to 207° C. The pressure was atmospheric. The material removed by distillation was added to the dropping bottle and re-added to the reaction vessel with the fresh acetone feed while the temperature was maintained at about 170–180° C. The entire addition required 9½ hours. Washed, dried product in the amount of 13 parts was recovered together with the unreacted acetone. The original phosphoric acid charge was readily re-usable. A portion of the product was distilled in a spinning band distillation column under reduced pressure as noted in Table I. Reflux temperatures indicated that the condensation products ranged from about $C_9$ to $C_{12}$ to about $C_{18}$. A bromine number determination on the overall product gave a value of 62.5 suggesting that the product was olefinic. Fluorescent Indicator Adsorption (FIA) analysis of the $C_{9+}$ product indicated the presence of 82% aromatics and 18% olefins. The refractive index of the product had increased to 1.5041 as compared to 1.3589 for acetone. Qualitative tests for aromatics, i.e. aluminum chloride with chloroform and ultraviolet analysis with a Beckman spectrophotometer (adsorption at 230–280 millimicrons) confirmed the presence of aromatic hydrocarbons.

TABLE I.—DISTILLATION OF PRODUCT RESULTING FROM THE REACTION OF ACETONE IN LIQUID PHOSPHORIC ACID AT 170–180° C.

[Column: Spinning band No. 3. Reflux ratio: 10 to 1 min.]

| Frac. No. | Weight percent Dist. | Reflux Temp., °C. | Press., mm. Hg | Estimated Reflux Temp., °C. at 760 mm. |
|---|---|---|---|---|
| 0 | 0.0 | | | |
| 1 | 6.7 | 73.6 | 14 | 191 |
| 2 | 16.9 | 73.6 | 14 | 191 |
| 3 | 23.6 | 109.6 | 14 | 232 |
| 4 | 34.8 | 114.4 | 9 | 250 |
| 5 | 41.6 | 120.6 | 9 | 258 |
| 6 | 55.0 | 137.8 | 9 | 278 |
| 7 | 74.1 | 144.2 | 9 | 285 |
| 8 | 79.8 | 144.2 | 9 | 285 |
| Residue | 92.2 | | | |
| Losses | 100.0 | | | |

Example 3—Reaction of 2-octanone in phosphoric acid

A quantity totaling 100 parts of 2-octanone was added to 200 parts by weight phosphoric acid over a period of about 5½ hours. Temperature of this experiment was maintained constant at 150° C. The product obtained amounted to 30 parts after washing and drying and represented 43.2% of that theoretically possible assuming only carbon and hydrogen in the product. The balance of the 2-octanone was recovered unchanged and ready for recycling. The product was analyzed according to the FIA method and found to comprise 10% aromatic and 90% olefinic hydrocarbons.

Example 4—Reactions of 2-hexanone in phosphoric acid

The condensation reaction involved the addition of 100 parts of 2-hexanone added over a period of about 6½ hours to 250 parts by weight of 90% phosphoric acid which was being stirred in the reaction vessel at atmospheric pressure. The reaction temperature dropped to an average of about 138° C. during the course of this experiment, but climbed to 152° C. after the completion of the addition of the ketone. The contents of the reaction vessel were allowed to reflux for an additional 1½ hours after the final addition of ketone. The total amount of product obtained after washing and drying was 29.5 parts. The refractive index of this product was 1.4605 while that of 2-hexanone was 1.4014. Fluorescent Indicator Adsorption analysis on the product showed an aromatic content of 19% and an olefinic content of about 81%. Gas chromatographic analysis showed a complex mixture of products having from two to four times as many carbon atoms as the feed.

Example 5.—Reaction of 2-pentanone in phosphoric acid

In this reaction 100 parts of 2-pentanone was added to 300 parts by weight of 90% phosphoric acid at about 150° C. and at atmospheric pressure. During the addition the reaction temperature dropped steadily to 130° C. after which it climbed to 138° C. and then remained relatively constant. The addition of 2-pentanone required about 5½ hours at which time the temperature had climbed to 154° C. The reaction product had a refractive index of 1.4650 as compared to a refractive index for 2-pentanone of 1.3917. FIA analysis on the products showed an aromatic content of 13% and an olefinic content of 87%. The product had from two to four times as many carbon atoms as the feed.

Example 6.—Reaction of 2-octene in phosphoric acid

A quantity totaling 100 parts of 2-octene was added to 100 parts by weight of 90% phosphoric acid over a period of 9½ hours. The temperature was maintained at 190° C. during this experiment. A total of 40 parts of product was recovered after washing and drying, resulting in a yield of approximately 40% of theoretical. The unreacted octene was separated by distillation and was suitable for return to the reaction vessel. Ultraviolet analysis on the Beckman spectrophotometer showed adsorption in the wave length range of 230–280 millimicrons, demonstrating the presence of aromatics. The FIA analysis was not definite as to the proportion of aromatic products; however, it is believed from the FIA results that the product contained about 5% of aromatic hydrocarbons. Further, ultraviolet and chemical tests definitely indicated the presence of a small proportion of aromatics. A portion of the product was subjected to distillation in a spinning band distilling column. Results of this distillation are shown below in Table II. The boiling point range of the product shows the presence of dimers and trimers. The bromine numbers of the fractions demonstrated that they consisted largely of monoolefins. Further characterization tests showed the presence of cyclic structures.

TABLE II.—DISTILLATION OF PRODUCT RESULTING FROM THE REACTION OF 2-OCTENE IN LIQUID PHOSPHORIC ACID AT 190° C.

[Column: Spinning band No. 3. Reflux ratio: 10 to 1 min.]

| Frac. No. | Weight Percent Dist. | Reflux Temp., °C. | Press., mm. Hg | Estimated Reflux Temp., °C. at 760 mm. | Refractive Index, 20° C. $n_D$ | Bromine No. |
|---|---|---|---|---|---|---|
| 0 | 0.0 | | | | | |
| 1 | 2.1 | 28.2 | 48 | 110 | 1.4204 | |
| 2 | 14.4 | 121.3 | 20 | 236 | 1.4694 | 74.3 |
| 3 | 21.6 | 131.3 | 20 | 248 | 1.4812 | |
| 4 | 39.2 | 128.0 | 3.5 | 290 | 1.4918 | 76.5 |
| 5 | 61.6 | 170.8 | 3.5 | 341 | 1.5119 | |
| 6 | 83.2 | 191.3 | 3.3 | 368 | 1.5260 | 44.9 |
| Residue | 94.0 | | | | | |
| Losses | 100.0 | | | | | |

Example 7

A second experiment involving the treatment of acetone in the presence of 90% phosphoric acid was carried out exactly as in Example 2 except that 100 parts of acetone was added to 160 parts (rather than 400 parts) of the 90% phosphoric acid. Under these conditions 28 parts of hydrocarbon product was recovered. The remainder of the acetone was recovered and was suitable for re-use. FIA analysis indicated an aromatic content of 46% and an olefinic content of 54%. A portion of the product was subjected to distillation (partly under vacuum) in a spinning band column. The boiling range of the various fractions indicated that the hydrocarbons formed fell into the $C_9$–$C_{24}$ range. The results of this distillation are shown below in Table III. The bromine number values of the fractions of distillate showed that the trimer and other products were largely monounsaturates. The presence of aromatics was confirmed by qualitative tests.

Example 8.—Reaction of 2-octanol in phosphoric acid

This experiment was made like that of Example 6 except that 2-octanol was used as the feed rather than 2-octene. The product consisted of hydrocarbons containing from two to four times the carbon atom content of the feed and was composed of olefinic compounds and aromatics. A portion of the olefinic material was cyclic.

TABLE III.—DISTILLATION OF PRODUCT RESULTING FROM THE REACTION OF ACETONE IN LIQUID PHOSPHORIC ACID AT 160–180° C.

[Column: Spinning band No. 3. Reflux ratio: 10 to 1 min.]

| Frac. No. | Weight Percent Dist. | Reflux Temp., °C. | Press., mm. Hg. | Estimated Reflux Temp., °C. at 760 mm. | Refractive Index, 20° C. $n_D$ | Bromine No. |
|---|---|---|---|---|---|---|
| 0 | 0.0 | | | | | |
| 1 | 5.7 | 176.2 | Atmos. | 176.2 | 1.4445 | 106.1 |
| 2 | 11.9 | 196.6 | Atmos. | 196.6 | 1.4692 | |
| 3 | 15.1 | 202.9 | Atmos. | 202.9 | 1.4741 | |
| 4 | 21.3 | 82.6 | 6 | 223 | 1.4741 | 119.0 |
| 5 | 28.1 | 95.0 | 4.5 | 244 | 1.4816 | |
| 6 | 35.0 | 101.6 | 4.3 | 254 | 1.4885 | |
| 7 | 41.9 | 113.6 | 4.2 | 268 | 1.4964 | 69.2 |
| 8 | 49.1 | 143.4 | 14 | 272 | 1.5029 | |
| 9 | 55.6 | 156.9 | 14 | 288 | 1.5079 | |
| 10 | 59.2 | 160.9 | 14 | 292 | 1.5121 | 49.4 |
| 11 | 66.0 | 139.0 | 4.5 | 296 | 1.5148 | |
| 12 | 73.3 | 148.0 | 3.6 | 313 | 1.5180 | |
| 13 | 80.5 | 156.7 | 4.1 | 320 | 1.5220 | 42.1 |
| 14 | 84.7 | 160.5 | 3.9 | 326 | 1.5230 | |
| 15 | 91.7 | 178.5 | 3.7 | 349 | 1.5301 | |
| 16 | 94.2 | 184.2 | 3.5 | 356 | 1.5369 | 54.2 |
| Residue | 96.6 | | | | | |
| Losses | 100.0 | | | | | |

The following catalytic dehydrogenation experiments were carried out in a fixed bed tubular type reactor.

Example 9

The product of Example 7 was subjected to dehydrogenation over a fresh charge of platinum on alumina catalyst. Temperature was maintained at 405° C. The feed was passed through the reactor at 0.16 part by weight of feed per part of catalyst per hour. FIA analysis on the dehydrogenated product showed an increase in aromatic content to 60%, an olefin content of 30%, and 10% paraffins. Ultraviolet light was absorbed in the 230–300 millimicron range, with the strongest adsorption at 257–280 millimicrons thus confirming the presence of aromatics. The boiling range of the product was 189–283° C. at 760 mm. as opposed to 105.2–358° C. for the feed at 760 mm. Thus, dehydrogenation narrowed the boiling range considerably. Such a change suggests that some cracking reactions may have been involved.

The following table shows the results of the catalytic dehydrogenation over platinum of the product from Examples 3, 4 and 5; shown as Examples 10, 11 and 12, respectively.

TABLE IV

| Ex. No. | Temp., °C. | Space Velocity, w/w/hr. | FIA Analysis, Percent Aromatic | | Ultraviolet Adsorption, millimicrons | Refractive Index, 20° C. $n_D$ | |
|---|---|---|---|---|---|---|---|
| | | | Feed | Product | | Feed | Product |
| 10 | 400 | 0.24 | 10 | a 65 | 230–300 | 1.4543 | 1.4768 |
| 11 | 400 | 0.37 | 24 | 68 | 230–280 | 1.4605 | 1.4832 |
| 12 | 400 | 0.28 | 14 | 78 | 230–300 | 1.4650 | 1.5007 | a 10% paraffin formed in this reaction.

The data of Table IV demonstrate that products rich in aromatic result from the dehydrogenations since the refractive indices of the products increased and the FIA analyses showed large increases in aromatic content.

Example 13.—Dehydrogenation of product from Example 6

A portion of the condensation product from Example 6 was dehydrogenated over a platinum catalyst at 400° C. and a space velocity of 0.2 part by weight of feed per part of catalyst per hour. A product was recovered with a refractive index of 1.5240 as compared to 1.5036 for the feed. The bromine number was 31.9 for the product and 53.9 for the feed indicating a much lower olefinic content. FIA analysis indicated a product comprising 72% aromatics and 28% olefins, as compared to about 5 to 10% aromatics in the feed. Adsorption of ultraviolet light of wave length 230–300 millimicrons was observed, confirming the presence of aromatics in high concentrations. Fractionation of the dehydrogenated product indicated a boiling range of 203–312° C. at atmospheric pressure, while that for the condensation product was 160–368° C.

What is claimed is:

1. A process for preparing a mixture of unsaturated cycloaliphatic hydrocarbons and aromatic hydrocarbons which comprises contacting a $C_3$–$C_{30}$ feedstock comprising a member selected from the group consisting of carbonyls, alcohols, and mixtures thereof, the carbonyls being represented by the generic formula

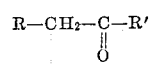

wherein R is selected from the group consisting of hydrogen, alkyl, and cycloalkyl radicals and R' is selected from the group consisting of hydrogen, alkyl, cycloalkyl, hydroxyl, and alkoxy radicals, with a liquid catalyst selected from the group consisting of phosphoric acid, polyphosphoric acid, and superphosphoric acid, and thereafter separating a product mixture having at least twice the number of carbon atoms as the feedstock.

2. The process of claim 1 wherein the temperature is about 125°–350° C.

3. The process of claim 2 wherein the feedstock comprises an alcohol.

4. The process of claim 2 wherein the feedstock comprises a carbonyl wherein R is selected from the group consisting of hydrogen and alkyl radicals and R' is an alkyl radical.

5. The process of claim 2 wherein at least a portion of the product mixture is catalytically dehydrogenated, thereby increasing the yield of aromatic hydrocarbons.

6. The process of claim 5 wherein the dehydrogenation temperature ranges from about 280°–450° C.

7. The process of claim 5 wherein the catalyst is platinum on alumina.

8. The process of claim 2 wherein at least a portion of the product mixture is catalytically hydrogenated, thereby producing saturated cycloaliphatics.

9. The process of claim 8 wherein the hydrogenation temperature is about 100–250° C., and the pressure is about 200–800 p.s.i.g.

10. The process of claim 8 wherein the catalyst is nickel on kieselguhr.

11. A process for preparing a mixture of unsaturated cycloaliphatic and aromatic hydrocarbons which comprises contacting a feedstock selected from the group consisting of carbonyls, alcohols, and mixtures thereof having about 3–30 carbon atoms per molecule, the carbonyls being represented by the generic formula.

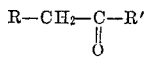

wherein R is selected from the group consisting of hydrogen, alkyl, and cycloalkyl radicals, and R' is selected from the group consisting of hydrogen, alkyl, cycloalkyl, hydroxyl, and alkoxy radicals, at a temperature of about 150–250° C., with a liquid catalyst selected from the group consisting of phosphoric acid, polyphosphoric acid, and superphosphoric acid, and thereafter separating a product mixture having at least twice the number of carbon atoms as the feedstock.

12. The process of claim 11 wherein the cataylst has a $P_2O_5$ content of about 60–90 weight percent, and the weight ratio of the catalyst to the feedstock is about 0.1–10 based on $P_2O_5$.

13. The process of claim 11 wherein the feedstock is an alcohol having 3 to 16 carbon atoms.

14. The process of claim 11 wherein the feedstock is a $C_3$–$C_{16}$ carbonyl and R is selected from the group consisting of hydrogen and alkyl radicals and R' is an alkyl radical.

References Cited

UNITED STATES PATENTS

| | | | |
|---|---|---|---|
| 2,230,461 | 2/1941 | Komarewsky | 260—673 |
| 2,514,546 | 7/1950 | Ipatieff et al. | 260—666 |
| 3,078,319 | 2/1963 | Wood | 260—668 |
| 3,126,420 | 3/1964 | Bloch et al. | 260—683.15 |

FOREIGN PATENTS

| | | |
|---|---|---|
| 1,079,428 | 5/1954 | France. |

HERBERT LEVINE, *Primary Examiner.*

DELBERT E. GANTZ, *Examiner.*